April 29, 1924.
J. L. DONAHUE
MOTOR VEHICLE PUMP
Filed May 4, 1922
1,492,436
2 Sheets-Sheet 1
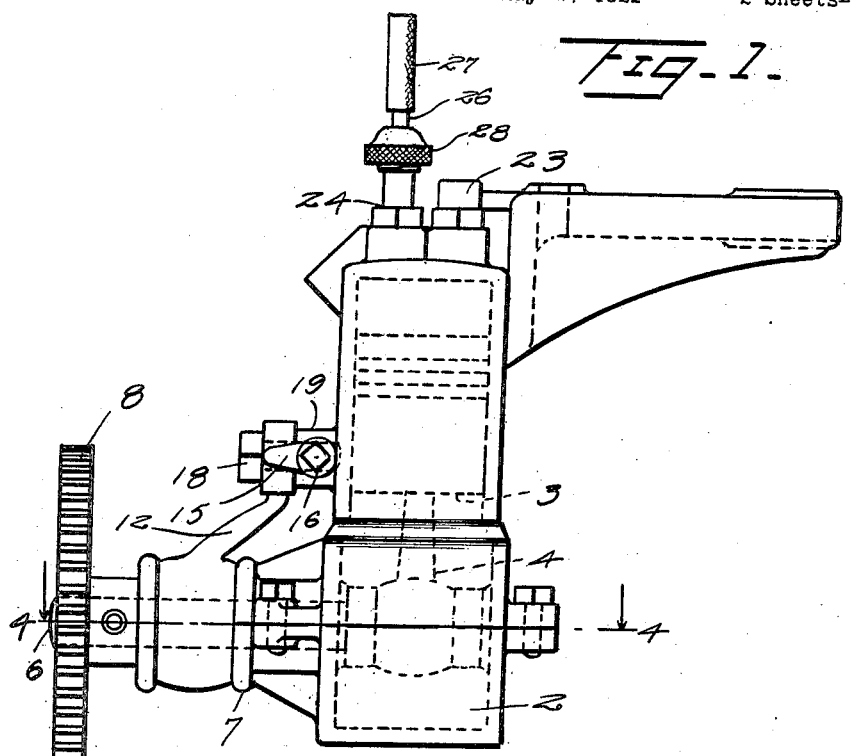
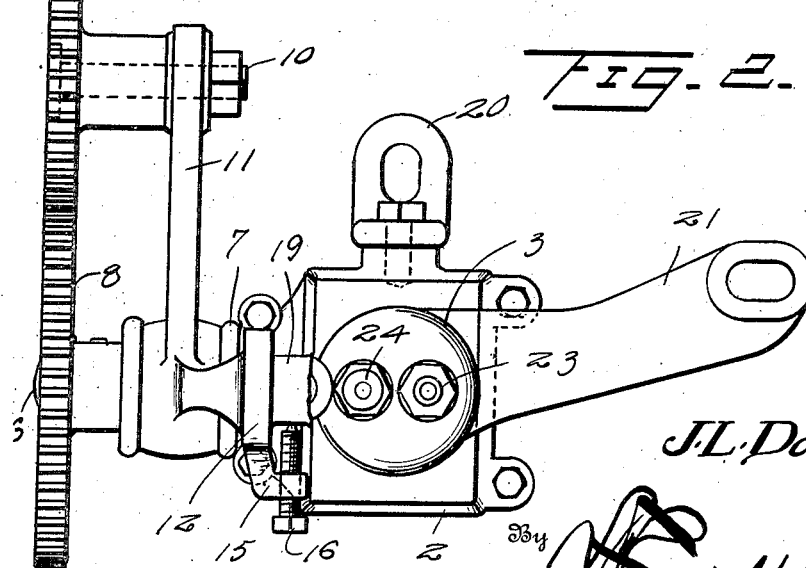
Inventor
J. L. Donahue

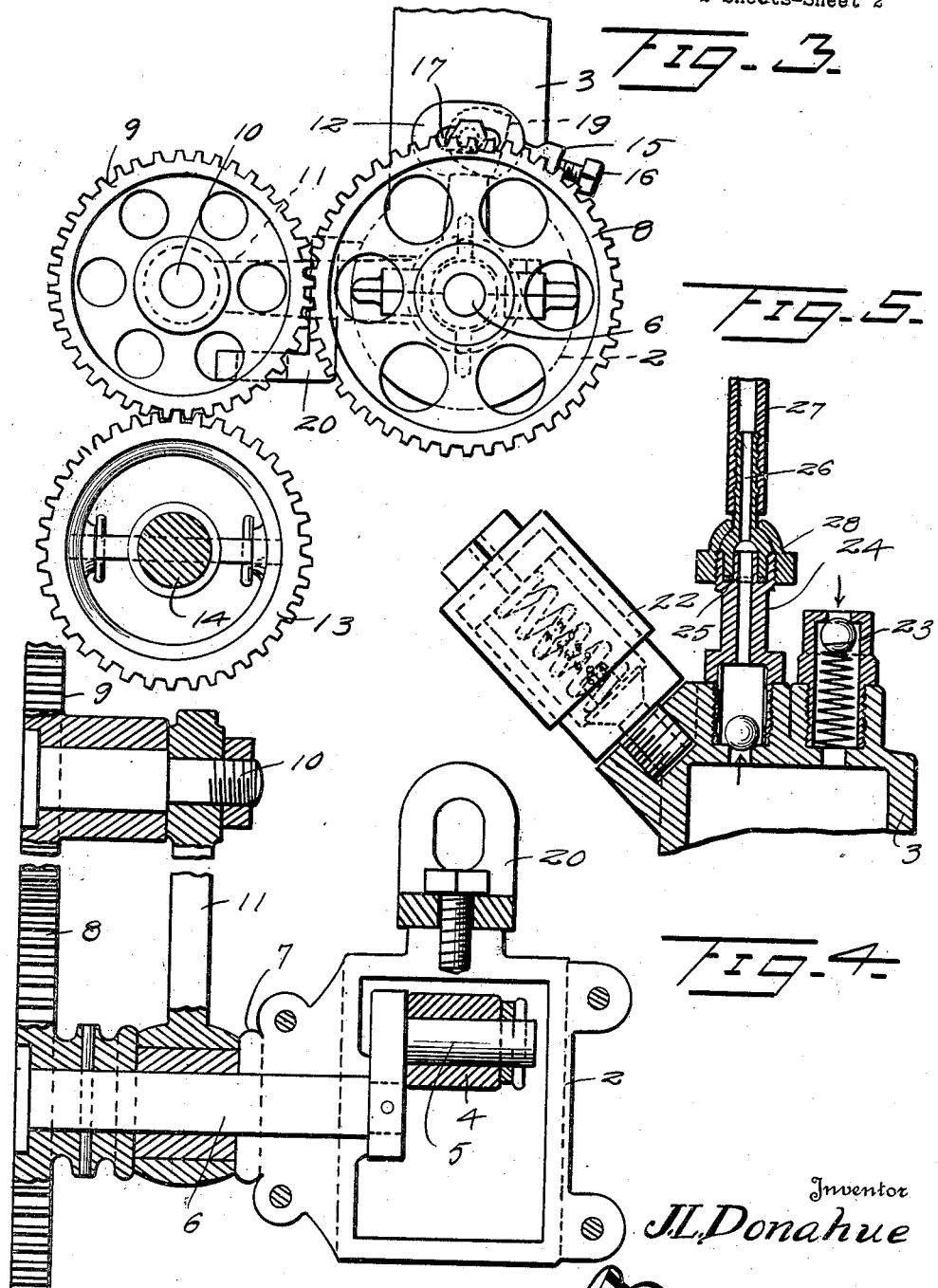

Patented Apr. 29, 1924.

1,492,436

UNITED STATES PATENT OFFICE.

JOSEPH L. DONAHUE, OF PROVIDENCE, RHODE ISLAND.

MOTOR-VEHICLE PUMP.

Application filed May 4, 1922. Serial No. 558,408.

*To all whom it may concern:*

Be it known that I, JOSEPH L. DONAHUE, a citizen of the United States, residing at Providence, in the county of Providence and State of Rhode Island, have invented certain new and useful Improvements in Motor-Vehicle Pumps; and I do hereby declare the following to be a full, clear, and exact description of the invention, such as will enable others skilled in the art to which it appertains to make and use the same.

The invention has for its object the provision of an air pump adapted for universal use in connection with automobiles and motor vehicles equipped with pneumatic tires, the pump structure and operating means being substantially the same in all instances but the attaching means varying to admit of adapting the pump for any particular make or construction of vehicle.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of an air pump embodying the invention,

Figure 2 is a top plan view thereof,

Figure 3 is a front view of the operating gearing,

Figure 4 is a horizontal section on the line 4—4 of Figure 1, and

Figure 5 is a detail view, showing more particularly the intake, outlet and safety valves.

Corresponding and like parts are referred to in the following description and designated in the several views of the drawings by like reference characters.

The numeral 1 designates the pump barrel or cylinder which has a crank case 2 formed therewith. A piston 3, operable within the barrel or cylinder 1 is connected by means of a rod 4 with a crank pin 5 at the inner end of a shaft 6 which is journaled in a bearing 7 provided at one side of the crank case 2 forming a part of the pump barrel or cylinder. A gear wheel 8 fast to the outer end of the shaft 6 is adapted to cooperate with a gear wheel 9 loosely carried by a bracket 11 journaled upon an axle 10 mounted upon the shaft 6 and having an arm 12 connected therewith and adjustable, whereby to admit of throwing the gear wheel 9 into or out of engagement with the gear wheel 13 fast to the projecting end of the crank shaft 14. In this manner, the pump is adapted to be thrown into or out of gear as required. The arm 12 has a lug 15 projecting laterally therefrom and provided with a set screw 16 which constitutes an adjustable stop to limit the movement of the arm 11 and the gear wheel 9 when the latter is in mesh with the gear wheel 13. The arm 12 is expanded at its outer end and an arcuate slot 17 is formed therein to receive a binding screw 18, whereby the arm 12 is adapted to be held in the adjusted position. The binding screw 18 is threaded into a boss 19 formed upon a side of the barrel 1 and which coacts with the screw 16 to limit the movement of the arm 12 in one direction, that is when the gear wheel 9 is in proper mesh with the gear wheel 13. Brackets 20 and 21 are attached to the barrel or cylinder 1 and serve as means for securing the pump when applied to the vehicle with which it is adapted to cooperate. It is to be understood that the brackets 20 and 21 may consist of connections of any kind best adapted to attach the pump to the particular make of vehicle for which adapted.

A safety valve 22 is coupled to the working end of the hub barrel to relieve excessive pressure. This valve may be of any preferred construction which will admit of adjusting the same to relieve the pressure at any predetermined point. An inlet valve 23 and an outlet valve 24 are likewise applied to the working end of the pump barrel to confine the pressure and prevent loss thereof.

When the pump is applied to an automobile or analogous motor vehicle equipped with pneumatic tires for inflating the same when required, it is made fast by the attaching parts 20 and 21 or their equivalent. The gear wheel 2 is at all times in mesh with the gear wheel 8 and is adapted to be thrown into or out of engagement with the gear wheel 13 as required. This is effected by turning the arms 11 and 12 about the shaft 6. Proper meshing of the teeth of the gear wheel 9 with the teeth of the gear wheel 13 is assured by adjustment of the set screw 16. The gear wheel 9 is held in the required adjusted position by means of the binding screw 18 clamping the arm 12, it being remembered that the arms 11 and 12 are of unitary formation. When it is required to inflate a tire, the hose pipe (not shown) connects the stem of the outlet valve 24 with the usual air valve of the tire and when the engine is running, the pump is operated and inflates the tire in a manner well understood. Over inflation is prevented by the release valve 22 which, as stated, may be set to automatically unseat at any predetermined pressure.

The outlet valve 24 has its outer end enlarged and grooved, as indicated at 25, to receive the reduced end of a coupling 26 to which the air hose 27 is connected. A union fitted to the outer end of the coupling 26 serves to connect the same to the valve 24.

What is claimed is:

1. A unit of the class described having a cylinder, power means operable therein, a shaft to drive said means journaled in the cylinder and extending transversely beyond the same, a gear wheel on said shaft exteriorly of the cylinder, an arm fulcrumed on said shaft between said gear wheel and cylinder, a gear wheel journaled on and carried by said arm, the second mentioned gear wheel being adapted to mesh with the driving gear wheel, and an adjustable connection between said arm and cylinder to control the position of the second gear wheel with respect to the driving gear.

2. A unit of the class described having a cylinder, power means operable therein, a shaft to drive said means journaled in the cylinder and extending transversely beyond the same, a bearing forming part of the cylinder and extending laterally therefrom in which the shaft is journaled, an arm journaled on said shaft outwardly of the bearing, a gear wheel on said shaft outwardly of the arm, a gear wheel in driving relation with said gear wheel and journaled on said arm, said arm having an upward extension, and an adjustable connection between said extension and cylinder to control the position of the second mentioned gear wheel with respect to a source of power.

3. A unit of the class described having a cylinder, power means operable therein, a shaft to drive said means extending transversely beyond the cylinder, a bearing forming part of the cylinder extending transversely thereof in which said shaft is journaled, an arm journaled on said shaft beyond the bearing, a gear wheel on said shaft beyond the arm, a gear wheel carried by said arm and in driving relation to the first mentioned gear wheel, an upward extension integral with said arm, a lug integral with said extension, a boss integral with the cylinder, a screw adjustably carried by said lug and engageable with the boss, said extension having an elongated slot, and a fastening passing through said slot and into said boss.

In testimony whereof I affix my signature in presence of two witnesses.

JOSEPH L. DONAHUE.

Witnesses:
BRIDGET HUGHES,
ROSE DONAHUE.